United States Patent [19]

Atkins

[11] 4,381,903
[45] May 3, 1983

[54] OPPOSED PISTON MACHINERY

[75] Inventor: John E. L. Atkins, Poole, England

[73] Assignee: Hamworthy Engineering Limited, Dorset, England

[21] Appl. No.: 190,599

[22] Filed: Sep. 25, 1980

[30] Foreign Application Priority Data

Sep. 26, 1979 [GB] United Kingdom ............... 7933308

[51] Int. Cl.³ ...................... F04B 25/00; F16H 21/22
[52] U.S. Cl. .................................. 417/254; 417/534; 74/44
[58] Field of Search ............... 417/534, 535, 536, 537, 417/254; 74/44

[56] References Cited

U.S. PATENT DOCUMENTS

| | | | |
|---|---|---|---|
| 1,027,923 | 5/1912 | Spohrer | 417/254 |
| 2,170,099 | 8/1939 | Stubings | 74/44 |
| 3,010,644 | 11/1961 | Zeidler | 417/534 |
| 3,581,583 | 6/1971 | Vinciguerra | 74/44 |

Primary Examiner—Richard E. Gluck
Assistant Examiner—Peter M. Cuomo
Attorney, Agent, or Firm—Parmelee, Miller, Welsh & Kratz

[57] ABSTRACT

An opposed-piston compressor has a rigid yoke which interconnects the pistons, and a drive comprising a crankshaft and balance weights within the yoke, enabling the shaft bearings to be placed close to the center line of the pistons.

3 Claims, 6 Drawing Figures

FIG.I.

OPPOSED PISTON MACHINERY

The present invention relates to opposed reciprocating piston machinery, and has particular but not exclusive reference to air compressors.

Opposed piston reciprocating machinery has been used in diesel, petrol, steam and gas engines with the cylinders arranged in a horizontal plane. The opposed pistons are separately connected to a central crankshaft by their own connecting rods.

It is also known that a certain type of very small compressor, for example a refrigeration compressor, has a sliding or slipper block which converts rotary to reciprocating motion. Another type of compressor works by having a cam/eccentric shaft, whereby opposed pistons are in one piece with, for example, a structure of legs. In this case, the balance weights are external to the legs and the reciprocating piston. This prevents the main bearings from being in close proximity to the crank and point of high load.

According to a first aspect of the invention, a machine comprises a pair of opposed pistons rigidly connected to one another by a yoke, the pistons being separably attached to the yoke, each piston being able to reciprocate within a cylinder, and a crank drive connected to the yoke.

Preferably the crankshaft is provided with one or more balance weights, which one or more balance weights are within the yoke.

In a preferred form of invention, the crankshaft drives the yoke by a single connecting rod and gudgeon pin. It is also preferable that the opposed pistons are substantially co-axial.

The invention will now be described by way of example with reference to the accompanying drawings, in which.

Figure 1:
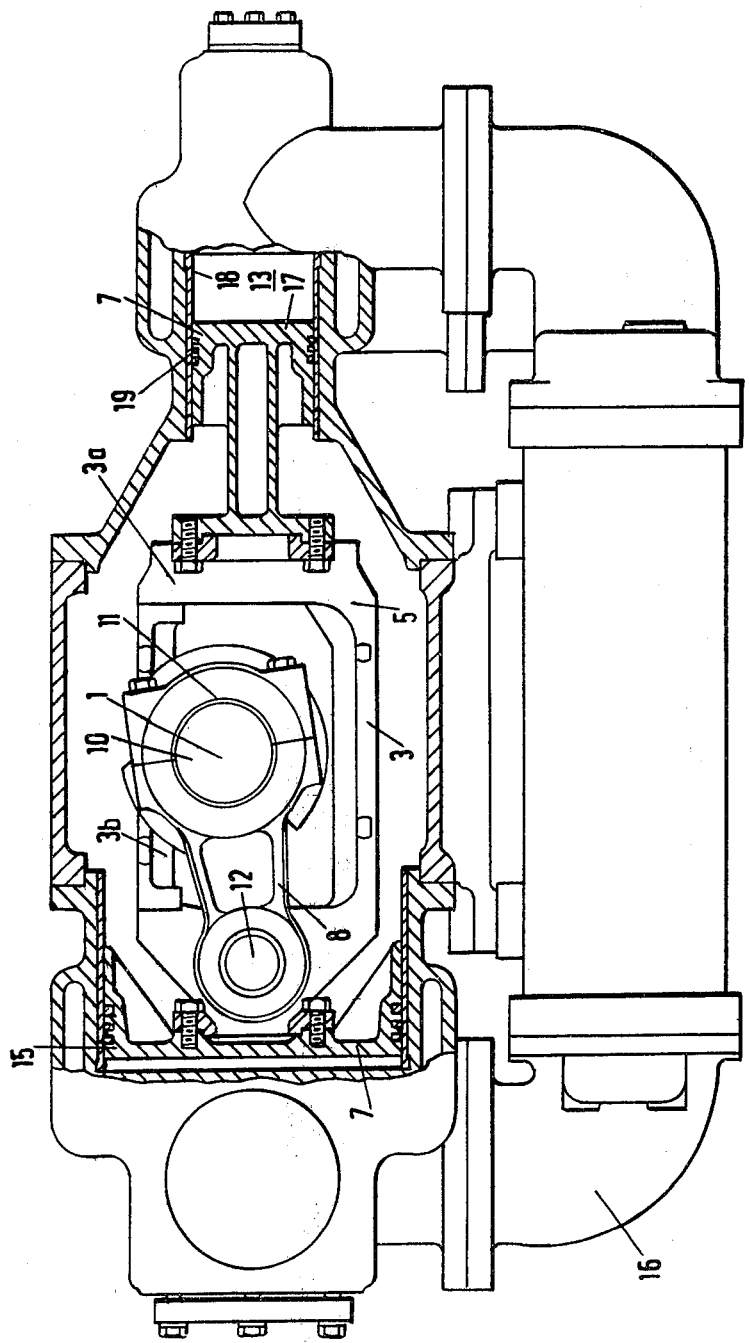
FIG. 1 is a longitudinal section of a compressor having a pair of opposed reciprocating pistons according to the invention.
Figure 2:
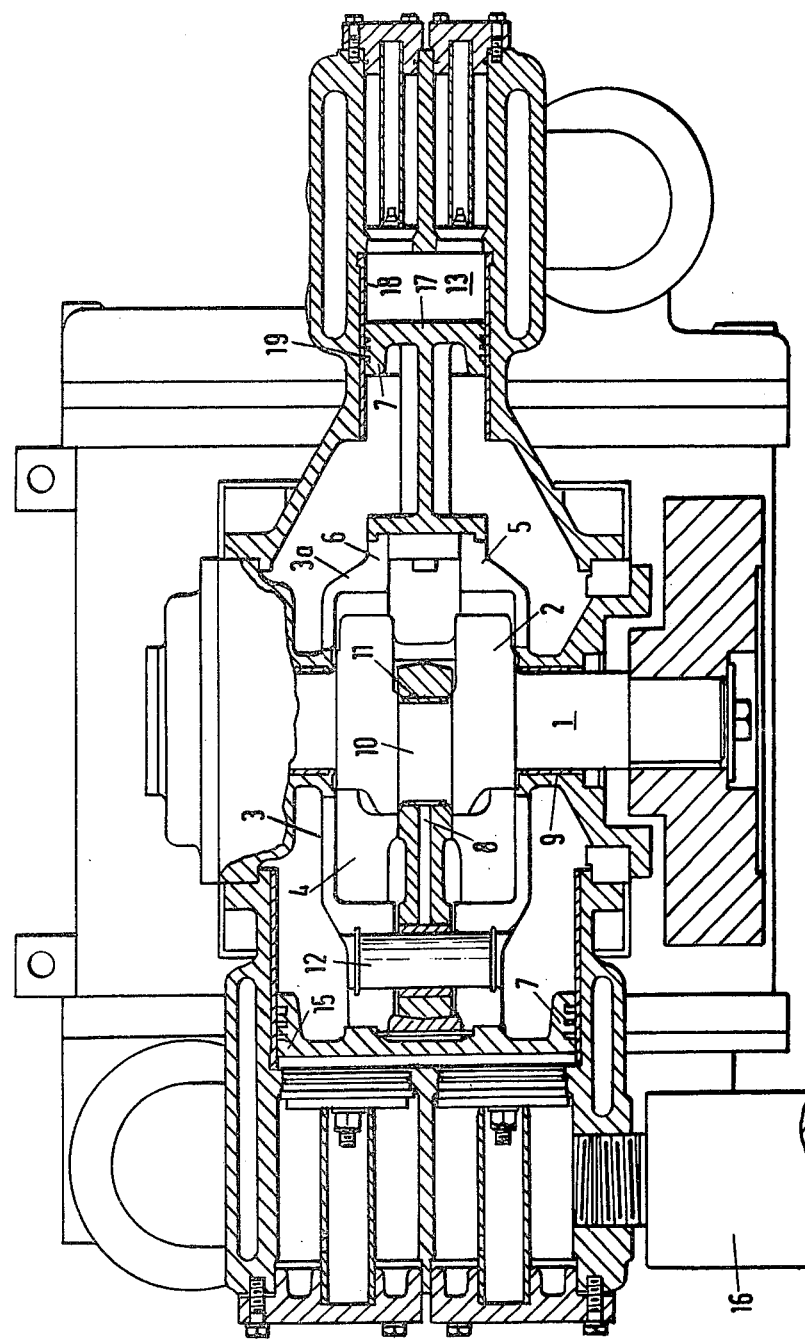
FIG. 2 is a plan view of the compressor as shown in FIG. 1.

FIGS. 1 and 2 show a compressor having a crankshaft 1 incorporating balance weights 2 on webs or cranks. The crankshaft 1 passes through a yoke 3, which is substantially rectangular-shaped in elevation. The yoke 3 has a central recess 4 between two substantially parallel sides 5 and 6. The two sides 5 and 6 are joined at each end of the yoke, where the two pistons 7 are separably attached to the yoke. The yoke is arranged around the crankshaft 1. The central recess 4 permits free movement of the crankshaft 1, balance weights 2, and the connecting rod 8 within the yoke.

The crankshaft is a conventional driveshaft, which has journals rotating in and supported by main bearings 9. The yoke 3 permits the main bearings to be in close proximity to the balance weights 2 accommodated within the yoke. The main bearings are closer together than if the balance weights were outside the yoke, and this arrangement helps to reduce the out of balance forces. The conversion of rotary motion of the crankshaft 1 to reciprocating motion of the pair of pistons 7 is via a single connecting rod 8, with a conventional horizontally or obliquely split big-end. The big-end is connected to the crankshaft 1 in the conventional manner. The crankshaft has a crank pin 10 which rotates in the big-end bearing 11 of a connecting rod 8.

A pair of opposed pistons 7 are rigidly connected to one another by the yoke 3. Each piston is accurately spigot located and secured at an end of the yoke. The yoke comprises an integral sub-assembly 3a having two separable bridge pieces 3b. Thus, the pistons are mounted in a rigid structure. The small end of the connecting rod 8 is pivotally connected by a gudgeon pin 12 to the yoke 3. The connecting rod 8 is accommodated within the central recess 4 of the yoke, and is substantially parallel to the bridge pieces 3b of the yoke. The gudgeon pin 12 is arranged perpendicularly to the connecting rod, and is located in the yoke by, for example, circlips. Thus, the rigid assembly of the yoke and the two pistons is driven by one connecting rod.

The pistons may be of various designs or style, depending on their application. The need for piston skirts is eliminated as each piston acts as a guide/cross-head for the other piston whilst moving within the opposed cylinders 13. It may be desirable to provide a certain amount of piston skirt, in the form of a 'slipper' in order to accommodate connecting rod thrust.

The crankshaft 1 is driven by a conventional prime mover, for example electric motor, internal combustion engine, steam or gas engines. The crankshaft drives the yoke 3 via the connecting rod 8. The embodiment shown in FIGS. 1 and 2 has a low pressure piston 15 which feeds air via a conduit 16 to a high pressure piston 17. Thus, the two opposed reciprocating pistons can be used to compress, for example, air.

The piston rubbing surfaces are reduced, which results in power saving and the removal of the risk of scuffing. Because of improved piston guide to diameter ratio, piston oscillation will be reduced and piston ring location and movement maintained more precisely, thus improving the life and performance of these components. Lubrication to the cylinder walls 18 from the crank case is direct to the piston ring support area 19 where oil control is more readily achieved.

The pistons 7 are separably attached to the yoke by, for example bolts. This means that the pistons can be removed for examination or renewal without splitting the connecting rod 8. The connecting rod is accommodated within the yoke 3. It is possible to achieve access to the connecting rod via the central recess 4. It is therefore possible to remove the connecting rod for examination or replacement of bearings if required, without disturbing the crankshaft or removing the yoke from the crank case.

Figure 3:
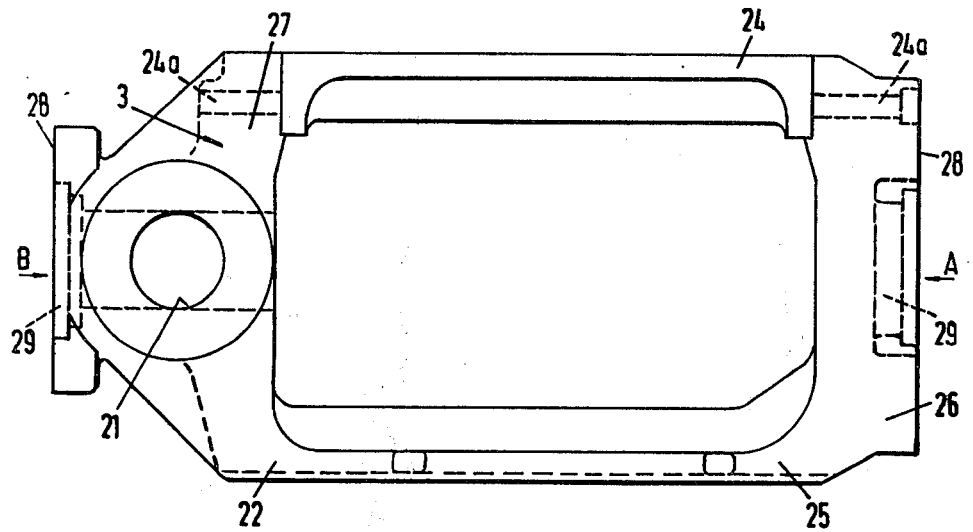
FIG. 3 is a side elevation of the yoke shown in FIG. 1.
Figures 4, 5:
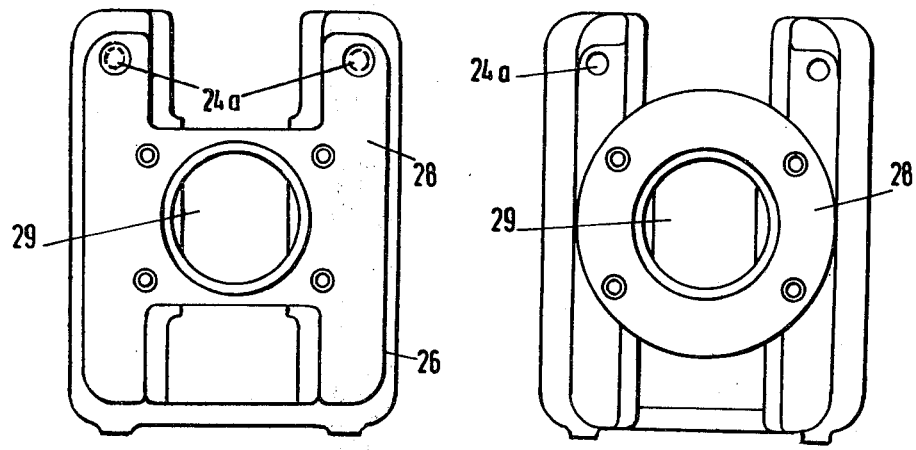
FIG. 4 is an end view of the yoke shown in FIG. 3, looking in the direction A.
FIG. 5 is an end view of the yoke shown in FIG. 3, looking in the direction B.
Figure 6:
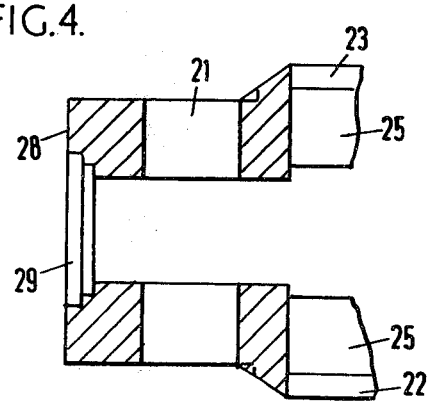
FIG. 6 is a section taken through the end of the yoke shown in FIG. 3.

FIGS. 3 to 6 illustrate the construction of the yoke 3. The yoke 3 incorporates the gudgeon pin bore 21. The yoke comprises two sides 22 and 23. Each side is substantially U-shaped in elevation, having two limbs 24 and 25 which are substantially parallel and co-planar to each other. At one end of the yoke 3, the two sides are integral with an end piece 26. At the opposite end of the end piece 26, there is a connecting portion 27 which is also integral with the two sides 22 and 23. The limb or bridge piece 24 of the sides 22 and 23 is separably attached to the end piece 26 and the connecting portion 27. The limb 24 is secured to the end piece 26 and the connecting portion 27 by bolts 24a. The connecting portion 27 incorporates the gudgeon pin bore 21. The end faces 28 of the yoke 3 and the end piece 26 have a recess or socket 29 to locate the pistons. The pistons are secured to the end faces 28 by, for example, bolts. It is to be understood that instead of having a recess or socket 29, each end face 28 can be spigoted to locate the pistons. FIG. 4 is an end view of the end piece 26 looking in the direction A in FIG. 3.

FIG. 5 is an end view of the yoke looking in the direction B in FIG. 3.

Further embodiments of the yoke 3 include a sub-assembly split along the horizontal centre line into two similar halves; and a sub-assembly split along the vertical plane at the opposite end of the yoke to the gudgeon pin bore. In this latter embodiment, the end piece 26 is separably attached to the yoke, and secured to the sides 22 and 23 by, for example bolts.

The shape of the yoke shown in FIGS. 3 to 6 is the result of detailed stress analysis, and has been determined to use the minimum amount of metal required to carry the operating stresses.

It is an advantage of the present invention that an "over square" arrangement, wherein the diameter of the piston exceeds the stroke, can be made, which can permit higher rotational speeds and can reduce piston speeds and inertia forces.

It is a further advantage of the invention that each piston can function as a guide or cross-head for the other piston, because each piston is rigidly connected to the other piston. It is a further advantage that, because of improved pistion guide to diameter ratio, piston oscillation can be reduced and piston ring location and movement can be maintain more precisely. Thus, the life and performance of the piston rings can be improved.

It is a further advantage of the invention that only one connecting rod and gudgeon pin bore is required to drive a pair of pistons.

I claim:

1. A reciprocatory machine comprising:
   a casing which incorporates two opposed coaxial cylinders;
   a respective piston slidable in each cylinder;
   a rigid yoke disposed between and rigidly interconnecting said pistons which yoke is a rigid box-like frame having opposite end members, each detachably secured to a respective piston, and four spaced side members rigidly connected to and extending between the said yoke end members, the yoke being supported in the casing solely by the said pistons, the said side members defining between them a first pair of opposed lateral openings and a second pair of opposed lateral openings;
   a crank shaft journalled in the housing and extending through said first pair of opposed lateral openings and having a crank disposed within the yoke and a balance weight on each side of the crank said balance weights also being disposed within the yoke, said second pair of opposed lateral openings accommodating said balance weights on rotation of the crank shaft;
   a gudgeon pin mounted in the yoke at one end of the yoke; and
   a connecting rod within the yoke, connecting the crank to the gudgeon pin.

2. A machine according to claim 1 in which the opposed cylinders are of different sizes and are interconnected, whereby the said machine forms a two-stage compressor.

3. A machine as in claim 1 or 2 in which the pistons and cylinders are over-square.

* * * * *